(12) United States Patent
Hasberg et al.

(10) Patent No.: US 11,854,225 B2
(45) Date of Patent: Dec. 26, 2023

(54) METHOD FOR DETERMINING A LOCALIZATION POSE OF AN AT LEAST PARTIALLY AUTOMATED MOBILE PLATFORM

(71) Applicant: Robert Bosch GmbH, Stuttgart (DE)

(72) Inventors: Carsten Hasberg, Ilsfeld-Auenstein (DE); Piyapat Saranrittichai, Korntal-Muenchingen (DE); Tayyab Naseer, London (GB)

(73) Assignee: ROBERT BOSCH GMBH, Stuttgart (DE)

( * ) Notice: Subject to any disclaimer, the term of this patent is extended or adjusted under 35 U.S.C. 154(b) by 488 days.

(21) Appl. No.: 17/021,604

(22) Filed: Sep. 15, 2020

(65) Prior Publication Data
US 2021/0104065 A1    Apr. 8, 2021

(30) Foreign Application Priority Data
Oct. 2, 2019    (DE) .......................... 102019215261.9

(51) Int. Cl.
*G06T 7/73*    (2017.01)
*G06F 18/25*    (2023.01)
(Continued)

(52) U.S. Cl.
CPC ................ *G06T 7/74* (2017.01); *G01S 19/54* (2013.01); *G06F 18/25* (2023.01); *G06N 3/045* (2023.01);
(Continued)

(58) Field of Classification Search
CPC .... G06V 10/811; G06V 10/82; G06V 10/764; G06V 20/13; G06T 7/74; G06T 2207/10032; G06T 2207/30252; G06T 2207/20084; G06T 2207/20081; G06T 2207/30244; G06N 3/08; G06N 3/045; G06F 18/25; G06F 18/256; G01S 19/54
See application file for complete search history.

(56) References Cited

U.S. PATENT DOCUMENTS

2019/0147320 A1* 5/2019 Mattyus ................ G06V 10/82
382/155

OTHER PUBLICATIONS

Hu S, Lee GH. Image-Based Geo-Localization Using Satellite Imagery. arXiv preprint arXiv:1903.00159v3. Jun. 2, 2019. (Year: 2019).*

(Continued)

*Primary Examiner* — Vu Le
*Assistant Examiner* — Tracy Mangialaschi
(74) *Attorney, Agent, or Firm* — NORTON ROSE FULBRIGHT US LLP; Gerard A. Messina

(57) ABSTRACT

A method for determining a localization pose of an at least partially automated mobile platform, the mobile platform being equipped to generate ground images of an area surrounding the mobile platform, and being equipped to receive aerial images of the area surrounding the mobile platform from an aerial-image system. The method includes: providing a digital ground image of the area surrounding the mobile platform; receiving an aerial image of the area surrounding the mobile platform; generating the localization pose of the mobile platform with the aid of a trained convolutional neural network, which has a first trained encoder convolutional-neural-network part and a second trained encoder convolutional-neural-network part.

12 Claims, 1 Drawing Sheet

(51) Int. Cl.
  *G06N 3/045* (2023.01)
  *G06V 10/80* (2022.01)
  *G06V 10/82* (2022.01)
  *G06V 20/13* (2022.01)
  *G01S 19/54* (2010.01)
  *G06V 10/764* (2022.01)

(52) U.S. Cl.
  CPC .......... *G06V 10/764* (2022.01); *G06V 10/811* (2022.01); *G06V 10/82* (2022.01); *G06V 20/13* (2022.01); *G06T 2207/10032* (2013.01); *G06T 2207/20081* (2013.01)

(56) References Cited

OTHER PUBLICATIONS

Liu L, Li H. Lending Orientation to Neural Networks for Cross-view Geo-localization. arXiv preprint arXiv:1903.12351. Mar. 29, 2019. (Year: 2019).*

* cited by examiner

METHOD FOR DETERMINING A LOCALIZATION POSE OF AN AT LEAST PARTIALLY AUTOMATED MOBILE PLATFORM

CROSS REFERENCE

The present application claims the benefit under 35 U.S.C. § 119 of German Patent Application No. DE 102019215261.9 filed on Oct. 2, 2019, which is expressly incorporated herein by reference in its entirety.

FIELD

The present invention relates to a method for determining a localization pose of an at least partially automated mobile platform with the aid of an aerial image and a ground image of the area surrounding the mobile platform.

BACKGROUND INFORMATION

Precise localization is a prerequisite for the driving of an at least partially automated platform like, e.g., autonomously operated vehicles.

A variety of different approaches have been pursued for localizing such a mobile platform with the aid of ground images of the area surrounding this mobile platform, these approaches typically being based on features with regard to the surroundings of the mobile platform, these features then being assigned via a high-resolution map to one pose of the mobile platform.

SUMMARY

The use of such a high-resolution map is associated with economic disadvantages. On the other hand, deep learning-based methods for determining a pose with the aid of a regression on the basis of ground images have the advantage of a fixed size of a particular map and a constant query time. A localization is able to be determined with such methods using monocular images, video image sequences and depth images from the direct camera position. At the same time, localization in a very large geographical area represents a challenge with regard to the capacity of such a neural network, e.g., in a larger urban area, in terms of scalability.

The present invention provides a method for determining a localization pose of an at least partially automated mobile platform, a method for generating a trained convolutional neural network for determining a localization pose, a method for controlling a mobile platform, a computer program, as well as a machine-readable storage medium. Advantageous refinements of the present invention are described herein.

In accordance with the present invention, a spatial context and a perspective of the surroundings of a mobile platform with the aid of aerial images that, for example, are centered around an estimated position of the mobile platform, may be used, together with ground images, to train a neural network to determine a pose of the mobile platform. In particular, this makes it possible to assign ambiguous features from ground images correctly over a larger geographical area.

According to one aspect of the present invention, a method is provided for determining a localization pose of an at least partially automated mobile platform, the mobile platform being equipped to generate ground images of an area surrounding the mobile platform, and being equipped to receive aerial images of the area surrounding the mobile platform from an aerial-image system. In accordance with an example embodiment of the present invention, in one step of the method, a digital ground image of the area surrounding the mobile platform is provided. In another step, an aerial image of the area surrounding the mobile platform is received.

In a further step, the localization pose of the mobile platform is generated with the aid of a trained convolutional neural network, the convolutional neural network having a first trained encoder convolutional-neural-network part and a second trained encoder convolutional-neural-network part.

Utilizing this example method, it is advantageously possible to determine a localization pose with the aid of visual ground images and visual aerial images of the area surrounding the mobile platform, without using a high-resolution map. Aerial images are thus used to predetermine a pose of the mobile platform for the training of a convolutional neural network. Since this method is not based on handmade features, it may be scaled well in terms of larger geographical areas.

With this method, which is based on a trained convolutional neural network, features from a larger spatial context such as from an aerial image, together with a ground image are able to learn to precisely determine the pose of the mobile platform on an urban scale. In this context, the aerial image may be available in the form of a satellite image, and the ground image may be generated by the mobile platform with the aid of a digital camera system.

A convolutional neural network basically has filters (Convolutional Layer) and aggregation layers (Pooling Layer) which alternately repeat, and at the end of the network, may have one or more layers of "normal" fully connected neurons (Dense/Fully Connected Layer).

In this context, the first and second trained encoder convolutional-neural-network part may be implemented as a part of a convolutional neural work, or these network parts may in each case be realized in the form of individual convolutional neural networks.

Both the ground image and the aerial image may exist as a digital image from different perspectives of the area surrounding the mobile platform, and may be generated with the aid of digital camera systems, for example.

The perspective of the aerial image of the area surrounding the mobile platform is a top-down view. For example, such an aerial image may be generated by camera systems of satellites, aircraft or drones. At the same time, such an aerial image may be both an individually made aerial image of the area surrounding the mobile platform, as well as a section from a larger aerial image, for instance, the section specifically being centered around an estimated pose of the mobile platform. In particular, such an aerial image may be a satellite image tile which may be retrieved for a specific satellite navigation position, e.g., a GPS position.

A localization pose of the mobile platform is a pose, that is, a definition of a position with three spatial dimensions and an orientation of the mobile platform in space which may be indicated, e.g., by three Euler angles, that is determined by this method.

A reference pose of the mobile platform is a pose which, for instance, by way of a reference system for determining the pose of the mobile platform, provides a very accurate indication for a training of the determination of the localization pose of this method.

A feed-forward neural network provides a framework for many different algorithms for machine learning, for interworking and for the processing of complex data inputs. Such neural networks learn to perform tasks on the basis of examples, without typically having been programmed with task-specific rules.

Such a neural network is based on a collection of connected units or nodes, which are known as artificial neurons. Each connection is able to transmit a signal from one artificial neuron to another. An artificial neuron which receives a signal is able to process it and then activate further artificial neurons connected to it.

In the case of conventional implementations of neural networks, the signal at a connection of artificial neurons is a real number, and the output of an artificial neuron is calculated by a nonlinear function of the sum of its inputs. The connections of the artificial neurons typically have a weight which adjusts with progressive learning. The weight increases or decreases the strength of the signal at a connection. Artificial neurons may have a threshold, so that a signal is only output if the overall signal exceeds this threshold.

Typically, a large number of artificial neurons are combined in layers. Different layers carry out possibly different types of transformations for their inputs. Signals migrate from the first layer, the input layer, to the last layer, the output layer, possibly after passing through the layers repeatedly.

In addition to the remarks above concerning the feedforward neural network, the structure of an artificial convolutional neural network is made up of one or more convolutional layers, possibly followed by a pooling layer. The sequence of layers may be used with or without normalization layers (e.g., batch normalization), zero-padding layers, dropout layers and activation functions such as Rectified Linear Unit ReLU, sigmoid function, tank function or softmax function, for example.

These units may repeat as often as desired; given sufficient repetitions, one then speaks of deep convolutional neural networks.

To train a structure of the encoder-decoder convolutional neural network thus defined, each neuron receives a random starting weight, for example. The input data are then given into the network, and each neuron weights the input signals with its weight and forwards the result to the neurons of the next layer. At the output layer, a result is made available. The magnitude of the error may be calculated, as well as the share each neuron had in this error, and the weight of each neuron is then changed in the direction which minimizes the error. Recursive runs, repeated measurements of the error and adjustment of the weights are then carried out until the error lies below a predetermined limit.

In this description of example embodiments of the present invention, the sequence of method steps is presented so that the method is easily comprehensible. However, one skilled in the art will recognize that many of the method steps may also be run through in a different sequence and lead to the same result. With this in mind, the sequence of the method steps may be changed accordingly, and is thus also disclosed.

A mobile platform may be understood to be an at least partially automated system which is mobile, and/or a driver-assistance system of a vehicle. An example may be an at least partially automated vehicle or a vehicle having a driver-assistance system. In other words, in this context, an at least partially automated system includes a mobile platform as regards an at least partially automated functionality, but a mobile platform also includes vehicles and other mobile machines including driver-assistance systems. Further examples for mobile platforms may be driver-assistance systems having a number of sensors, mobile multi-sensor robots such as robotic vacuum cleaners or lawn mowers, a multi-sensor monitoring system, a manufacturing machine, a personal assistant, a shuttle, a robotaxi, a ship, an aircraft, commercial vehicles or an access control system. Each of these systems may be a fully or partially automated system.

According to one aspect of the present invention, to generate the localization pose, in one step, the ground image is input as input signal of the first trained encoder convolutional-neural-network part, in order to form a first encoding vector. In another step, the aerial image is input as input signal of the second trained encoder convolutional-neural-network part, in order to form a second encoding vector. And in a further step, the localization pose of the mobile platform is generated with the aid of the fused first and second encoding vectors.

In this context, the input of the input signal to the neural network means that the signal, thus, the ground image or the aerial image, is supplied to the input layer of the neural network.

According to one aspect of the present invention, at least one layer of the first trained encoder convolutional-neural-network part and at least one corresponding layer of the second trained encoder convolutional-neural-network part have identical weights.

In this example method, both a ground image such as an RGB image from the front camera of a mobile platform, as well as an aerial image like, e.g., a satellite image, are provided to the convolutional neural network. The mutual weights of at least one early convolutional layer of the two networks enable the neural network to exchange this different information in an earlier stage between the two network parts, before the output signals of the two network parts later fuse for the final pose regression. In the fusion of the two output signals of the two network parts, the features are fused with the aid of fully connected layers, in order to determine the pose.

In other words, this method helps to disambiguate ground images which look very similar, but are far apart spatially. Without the exchange of the weights described, both the aerial image and the ground image would lead to a similar pose for these images. By taking into account the aerial images of the area surrounding the mobile platform utilizing this method, the convolutional neural network is trained via the distinctive spatial disposition of features of the aerial image, to learn discriminative features, and additionally, the pose is able to be determined more precisely.

In order to be able to determine the vehicle position or the vehicle localization pose with high accuracy, the similarity of ground images and aerial images like, e.g., at least local parts of satellite images, are not compared, but rather, the pose of a mobile platform is derived from the provided ground images together with the corresponding local aerial images or local satellite images.

Consequently, an end-to-end learning is thus carried out which is based on ground images and aerial images in order to achieve good scalability. The advantage of position precursors in terms of good scalability is thus combined with the advantages of the use of convolutional neural networks.

According to one aspect of the present invention, the first encoding vector and the second encoding vector are fused, in that the first encoding vector and the second encoding vector become joined together and are fully connected with at least one output layer of a fusion part of the convolutional neural network, an output signal of the output layer indicating the localization pose.

In this context, in fully connected layers, the neurons of one layer are connected to all neurons of the following layer, and are therefore called "fully-connected layer."

According to one aspect of the present invention, the aerial image of the area surrounding the mobile platform was generated with the aid of a satellite, an aircraft or a drone.

According to one aspect of the present invention, the aerial image is selected with the aid of a pose of the mobile platform, which was determined with a global navigation system and/or a navigation system based on a cellular network.

Owing to this position selection with the aid of a navigation system, the search space for the features is reduced, and the determination of the poses with the aid of the ground images may be assessed more finely, utilizing a reduced volume of data.

According to a further aspect of the present invention, the ground image of the area surrounding the mobile platform was generated with the aid of a digital camera system.

In so doing, the ground image is generated typically from a front camera of the mobile platform with the corresponding perspective, with the aid of a digital camera system.

This method for determining the localization pose of the mobile platform may be combined with various existing methods to improve the determination of the pose. In particular, it is an integration of sequential information, for example, and a consideration of geometric limitations, which may lead to a further gain in performance.

A main advantage of this method is the scalability of the application of the method, since both contextual information and large-area localization information goes into the method.

Moreover, a constant query time for the pose determination is obtained with this method, which is not true in the case of conventional feature-based methods. For example, in the case of 3D-3D/2D-3D feature matching, good scaling is not achieved with large map sizes.

A fixed "map size" is obtained in the case of this method, since the map is represented implicitly by the weights of the adjusted and stored network.

In addition, with this example method, publicly accessible information is used for a first estimated pose, and satellite images may be used for the aerial images, for example, which are economically advantageous and require no manual labeling.

According to one aspect of the present invention, an example method is provided for generating a trained convolutional neural network to determine a localization pose of an at least partially automated mobile platform with the aid of a ground image of an area surrounding the mobile platform and an aerial image of the area surrounding the mobile platform. In this context, the convolutional neural network has a first encoder convolutional-neural-network part and a second encoder convolutional-neural-network part and a fusion part.

The trained convolutional neural network is generated utilizing a large number of training cycles, each training cycle having the following steps.

In one step, a reference pose of the at least partially automated mobile platform is provided. In another step, a ground image of the area surrounding the mobile platform in the reference pose is provided. In a further step, an aerial image of the area surrounding the mobile platform in the reference pose is provided. In a further step, the ground image is used as input signal of the first encoder convolutional-neural-network part, in order to generate a first output signal. In a further step, the aerial image is used as input signal of the second encoder convolutional-neural-network part, in order to generate a second output signal. In a further step, the localization pose is determined with the aid of the fusion part, which fuses the first output signal and the second output signal. And in a further step, the convolutional neural network is adapted in order to minimize a deviation from the respective reference pose in determining the respective specific localization pose.

According to one aspect of the present invention, the fusing of the first output signal and the second output signal for generating the trained convolutional neural network has the following steps.

In one step, a first encoding vector is formed with the first output signal. In another step, a second encoding vector is formed with the second output signal. In a further step, the first encoding vector and the second encoding vector are fused by joining together the first encoding vector and the second encoding vector and a full connection of the joined-together encoding vectors with an output layer of the fusion part of the convolutional network, the output layer indicating the localization pose.

According to one aspect of the present invention, during the adapting or, in other words the training, of the convolutional neural network, at least one layer of the first encoder convolutional-neural-network part and a corresponding layer of the second encoder convolutional-neural-network part mutually exchange corresponding weights of the corresponding layers.

In accordance with an example embodiment of the present invention, a method is provided in which, based on the localization pose of an at least partially automated mobile platform, a control signal is provided to control the mobile platform. Alternatively or additionally, based on the localization pose of the at least partially automated mobile platform, a warning signal is provided for warning a vehicle occupant.

The term "based on" is to be understood broadly with regard to the feature that a control signal is provided based on the localization pose. It is to be understood to the effect that the localization pose is utilized for every determination or calculation of a control signal, while not ruling out that other input variables are also utilized for this determination of the control signal. The same holds true analogously for the provision of a warning signal.

In accordance with an example embodiment of the present invention, a device is provided which is equipped to carry out one of the methods described herein. With such a device, the method may easily be integrated into different systems.

In accordance with an example embodiment of the present invention, a computer program is provided that includes commands which, upon execution of the program by a computer, cause it to carry out one of the methods described herein. Such a computer program permits the use of the method described in different systems.

In accordance with an example embodiment of the present invention, a machine-readable storage medium is provided, on which the computer program described herein is stored.

BRIEF DESCRIPTION OF THE DRAWINGS

Exemplary embodiments of the present invention are represented with reference to FIGS. 1 and 2 and are explained in greater detail below.

DETAILED DESCRIPTION OF EXAMPLE EMBODIMENTS

Figure 1:
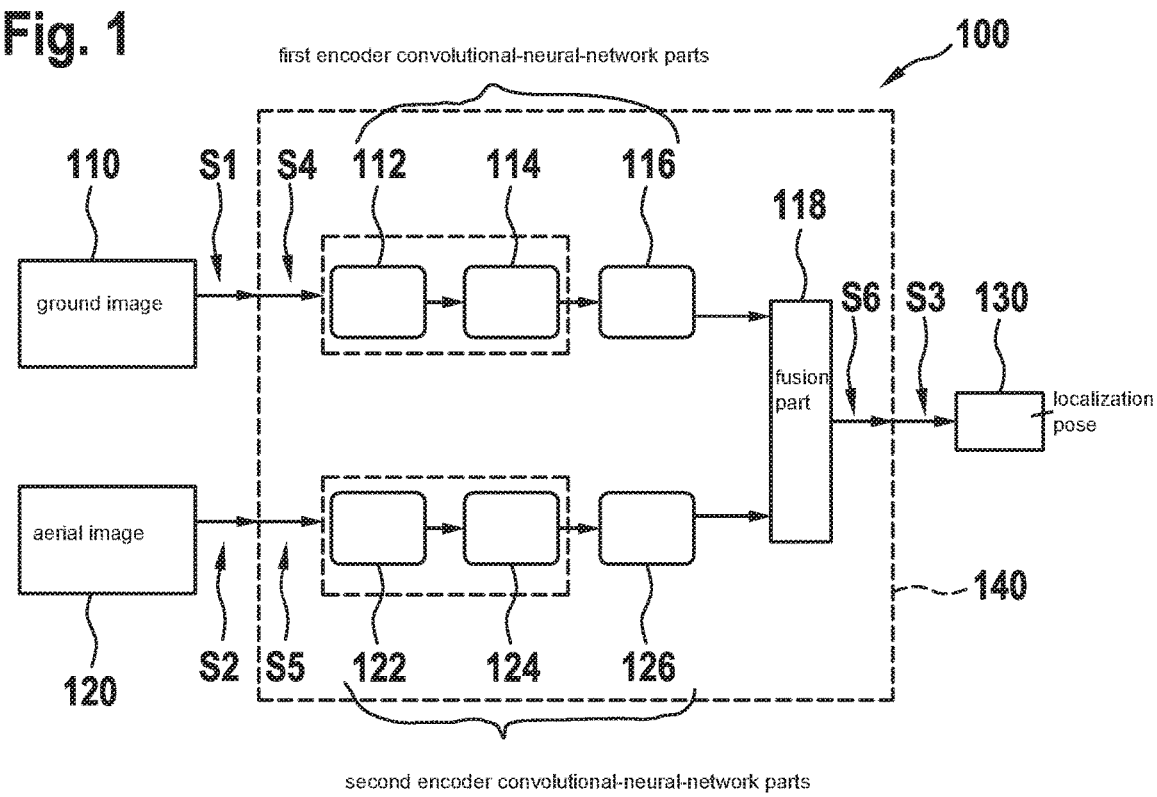
FIG. 1 shows a flowchart of a method for determining a localization pose of an at least partially automated mobile platform, in accordance with an example embodiment of the present invention.

FIG. 1, utilizing a data flowchart, schematically sketches method 100 for determining a localization pose 130 of an at least partially automated mobile platform. A digital ground image 110 of the area surrounding the mobile platform may be provided S1 by the mobile platform itself, for example, which is equipped to generate these ground images, e.g., via a digital camera system.

In addition, an aerial image of the area surrounding the mobile platform is received S2 by the mobile platform, e.g., from an aerial-image system. For example, such an aerial-image system is able to generate aerial image 120 of the area surrounding the mobile platform with the aid of a satellite, an aircraft or a drone. In order, for example, to generate or to select aerial image 120 of the area surrounding the mobile platform, a pose of the mobile platform may be determined with the aid of a global navigation system and/or a navigation system based on a cellular network. In this context, the mobile platform itself may be equipped with a system which determines such a pre-determination of the pose with the aid of a global navigation system and/or a navigation system based on a cellular network.

The localization pose of the mobile platform is then generated S3 with the aid of a trained convolutional neural network, the convolutional neural network having a first trained encoder convolutional-neural-network part 112, 114, 116 and a second trained encoder convolutional-neural-network part 122, 124, 126.

To generate S3 localization pose 130 of the mobile platform, ground image 110 is input S4 as input signal of first trained encoder convolutional-neural-network part 112, 114, 116, in order to form a first encoding vector 116. Parallel to that, aerial image 120 is input S5 as input signal of second trained encoder convolutional-neural-network part 122, 124, 126, in order to form a second encoding vector 126. Localization pose 130 of the mobile platform is generated S6 by fusing first encoding vector 116 and second encoding vector 126. To that end, at least one layer 112 of first trained encoder convolutional-neural-network part 112, 114, 116 and at least one corresponding layer 122 of second trained encoder convolutional-neural-network part 122, 124, 126 have identical weights. In that context, first encoding vector 116 and second encoding vector 126 are fused, in that first encoding vector 116 and second encoding vector 126 become joined together and are fully connected with at least one output layer of a fusion part 118 of the convolutional neural network, an output signal of the output layer of the fusion part of the convolutional neural network indicating localization pose 130.

Figure 2:
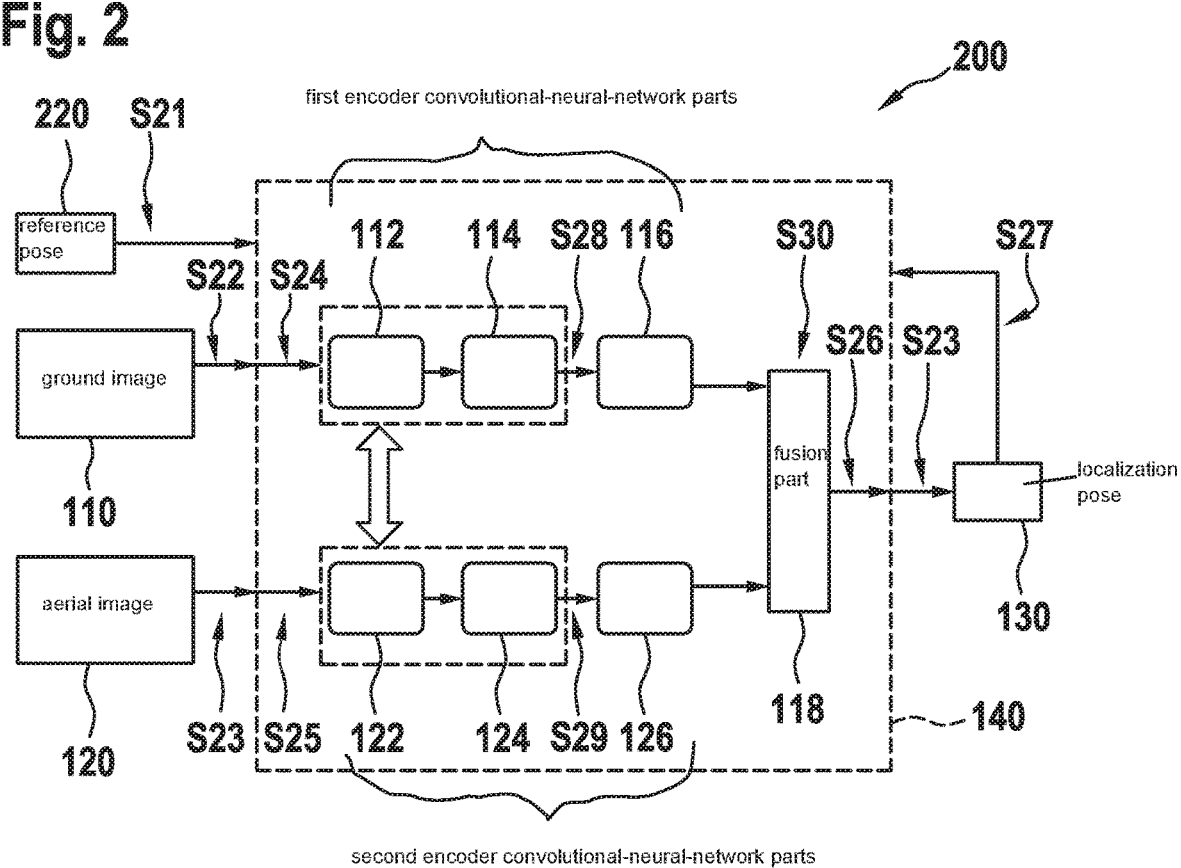
FIG. 2 shows a flowchart of a method for generating a trained convolutional neural network to determine a localization pose, in accordance with an example embodiment of the present invention.

FIG. 2, utilizing a data flowchart, schematically sketches method 200 for generating a trained convolutional neural network to determine a localization pose 130 of an at least partially automated mobile platform, with the aid of a ground image 110 of an area surrounding the mobile platform and aerial image 120 of the area surrounding the mobile platform. The convolutional neural network has a first encoder convolutional-neural-network part 112, 114, 116 and a second encoder convolutional-neural-network part 122, 124, 126 and a fusion part 118.

Trained convolutional neural network 140 is generated utilizing a large number of training cycles, each training cycle having the following steps.

In a step S21, a reference pose 220 of the at least partially automated mobile platform is provided. In another step S22, a ground image 110 of the area surrounding the mobile platform in reference pose 220 is provided. In a further step S23, an aerial image of the area surrounding the mobile platform in reference pose 220 is provided. In a further step S24, ground image 110 is used as input signal of first encoder convolutional-neural-network part 112, 114, 116, in order to generate a first output signal. In a further step S25, aerial image 120 is used as input signal of second encoder convolutional-neural-network part 122, 124, 126, in order to generate a second output signal. In a further step, localization pose 130 is determined S26 with the aid of fusion part 118, which fuses the first output signal and the second output signal. And in a further step S27, the convolutional neural network is adapted in order to minimize a deviation from respective reference pose 220 in determining respective specific localization pose 130.

In adapting S27 the convolutional neural network, at least one layer 112 of first encoder convolutional-neural-network part 112, 114, 116 and a corresponding layer 122 of second encoder convolutional-neural-network part 122, 124, 126 mutually exchange corresponding weights of corresponding layers 112, 122, so that after the training, the corresponding layers have identical weights.

The fusing of the first output signal and the second output signal for generating the trained convolutional neural network has the following steps. In one step S28, a first encoding vector 116 is formed with the first output signal. In another step S29, a second encoding vector 126 is formed with the second output signal. In a further step S30, first encoding vector 116 and second encoding vector 126 are fused by joining together first encoding vector 116 and second encoding vector 126 and a full connection of joined-together encoding vectors 116, 126 with an output layer of fusion part 118 of the convolutional neural network, the output layer indicating localization pose 130.

What is claimed is:

1. A method for determining a localization pose of an at least partially automated mobile platform, the mobile platform being equipped to generate ground images of an area surrounding the mobile platform, and being equipped to receive aerial images of the area surrounding the mobile platform from an aerial-image system, the method comprising the following steps:

providing a digital ground image of the area surrounding the mobile platform;
   receiving an aerial image of the area surrounding the mobile platform;
   a first trained encoder convolutional-neural-network part of a trained convolutional neural network using the ground image as an input signal to form a first encoding vector at a particular layer of the first trained encoder convolutional-neural-network part;
   a second trained encoder convolutional-neural-network part of the trained convolutional neural network using the aerial image as an input signal to form a second encoding vector at a particular layer of the second trained encoder convolutional-neural-network part; and
   fusing the first and second encoding vectors by joining the first and second encoding vectors to form neurons of the particular layer of the first trained encoder convolutional-neural-network part and neurons of the particular layer of the second trained encoder convolutional-neural-network part as a combination of input neurons fully connected to neurons of a downstream layer of the convolutional neural network, which generates the localization pose of the mobile platform from the combination of input neurons without the first and second encoding vectors being compared.

2. The method as recited in claim 1, wherein at least one layer of the first trained encoder convolutional-neural-network part and at least one corresponding layer of the second trained encoder convolutional-neural-network part have identical weights.

3. The method as recited in claim 1, wherein the aerial image of the area surrounding the mobile platform is generated using a satellite, or an aircraft, or a drone.

4. The method as recited in claim 1, wherein the aerial image is selected using a pose of the mobile platform, which is determined with a global navigation system and/or a navigation system based on a cellular network.

5. The method as recited in claim 1, wherein the ground image of the area surrounding the mobile platform is generated using a digital camera system.

6. The method as recited in claim 1, further comprising:
based on the localization pose, providing a control signal for controlling the at least partially automated mobile platform.

7. The method as recited in claim 1, further comprising:
based on the localization pose, providing a warning signal to warn an occupant of the at least partially automated mobile platform.

8. A method for generating a trained convolutional neural network to determine a localization pose of an at least partially automated mobile platform using a ground image of an area surrounding the mobile platform and an aerial image of the area surrounding the mobile platform, the convolutional neural network having a first encoder convolutional-neural-network part and a second encoder convolutional-neural-network part, and the trained convolutional neural network being generated utilizing a large number of training cycles, each of the training cycles including the following:
providing a respective reference pose of the at least partially automated mobile platform;
providing a ground image of the area surrounding the mobile platform in the respective reference pose;
providing an aerial image of the area surrounding the mobile platform in the respective reference pose;
the first trained encoder convolutional-neural-network part using the ground image as an input signal to form a first encoding vector at a particular layer of the first trained encoder convolutional-neural-network part;
the second trained encoder convolutional-neural-network part of the trained convolutional neural network using the aerial image as an input signal to form a second encoding vector at a particular layer of the second trained encoder convolutional-neural-network part;
fusing the first and second encoding vectors by joining the first and second encoding vectors to form neurons of the particular layer of the first trained encoder convolutional-neural-network part and neurons of the particular layer of the second trained encoder convolutional-neural-network part as a combination of input neurons fully connected to neurons of a downstream layer of the convolutional neural network, which generates a respective localization pose of the mobile platform from the combination of input neurons without the first and second encoding vectors being compared; and
adapting the convolutional neural network to minimize a deviation from the respective reference pose in determining the respective localization pose.

9. The method as recited in claim 8, wherein in adapting the convolutional neural network, at least one layer of the first encoder convolutional-neural-network part and a corresponding layer of the second encoder convolutional-neural-network part mutually exchange corresponding weights of the at least one layer and the corresponding layer.

10. A device configured to determine a localization pose of an at least partially automated mobile platform, the mobile platform being equipped to generate ground images of an area surrounding the mobile platform, and being equipped to receive aerial images of the area surrounding the mobile platform from an aerial-image system, the device configured to:
provide a digital ground image of the area surrounding the mobile platform;
receive an aerial image of the area surrounding the mobile platform;
implement a first trained encoder convolutional-neural-network part of a trained convolutional neural network that uses the ground image as an input signal to form a first encoding vector at a particular layer of the first trained encoder convolutional-neural-network part;
implement a second trained encoder convolutional-neural-network part of the trained convolutional neural network that uses the aerial image as an input signal to form a second encoding vector at a particular layer of the second trained encoder convolutional-neural-network part; and
fuse the first and second encoding vectors by joining the first and second encoding vectors to form neurons of the particular layer of the first trained encoder convolutional-neural-network part and neurons of the particular layer of the second trained encoder convolutional-neural-network part as a combination of input neurons fully connected to neurons of a downstream layer of the convolutional neural network, which generates the localization pose of the mobile platform from the combination of input neurons without the first and second encoding vectors being compared.

11. A device configured to generate a trained convolutional neural network to determine a localization pose of an at least partially automated mobile platform using a ground image of an area surrounding the mobile platform and an aerial image of the area surrounding the mobile platform, the convolutional neural network having a first encoder convolutional-neural-network part and a second encoder convolutional-neural-network part, and the trained convolutional neural network being generated utilizing a large number of training cycles, in the device being configured to, in each of the training cycles:
provide a respective reference pose of the at least partially automated mobile platform;
provide a ground image of the area surrounding the mobile platform in the respective reference pose;
provide an aerial image of the area surrounding the mobile platform in the respective reference pose;
implement the first trained encoder convolutional-neural-network part to use the ground image as an input signal to form a first encoding vector at a particular layer of the first trained encoder convolutional-neural-network part;

implement the second trained encoder convolutional-neural-network part of the trained convolutional neural network to use the aerial image as an input signal to form a second encoding vector at a particular layer of the second trained encoder convolutional-neural-network part;

fuse the first and second encoding vectors by joining the first and second encoding vectors to form neurons of the particular layer of the first trained encoder convolutional-neural-network part and neurons of the particular layer of the second trained encoder convolutional-neural-network part as a combination of input neurons fully connected to neurons of a downstream layer of the convolutional neural network, which generates a respective localization pose of the mobile platform from the combination of input neurons without the first and second encoding vectors being compared; and adapt the convolutional neural network to minimize a deviation from the respective reference pose in determining the respective localization pose.

12. A non-transitory machine-readable storage medium on which is stored a computer program for determining a localization pose of an at least partially automated mobile platform, the mobile platform being equipped to generate ground images of an area surrounding the mobile platform, and being equipped to receive aerial images of the area surrounding the mobile platform from an aerial-image system, the computer program, when executed by a computer, causing the computer to perform the following steps:

providing a digital ground image of the area surrounding the mobile platform;

receiving an aerial image of the area surrounding the mobile platform;

a first trained encoder convolutional-neural-network part of a trained convolutional neural network using the ground image as an input signal to form a first encoding vector at a particular layer of the first trained encoder convolutional-neural-network part;

a second trained encoder convolutional-neural-network part of the trained convolutional neural network using the aerial image as an input signal to form a second encoding vector at a particular layer of the second trained encoder convolutional-neural-network part; and fusing the first and second encoding vectors by joining the first and second encoding vectors to form neurons of the particular layer of the first trained encoder convolutional-neural-network part and neurons of the particular layer of the second trained encoder convolutional-neural-network part as a combination of input neurons fully connected to neurons of a downstream layer of the convolutional neural network, which generates the localization pose of the mobile platform from the combination of input neurons without the first and second encoding vectors being compared.

* * * * *